United States Patent [19]
Krebs

[11] Patent Number: 5,642,250
[45] Date of Patent: Jun. 24, 1997

[54] PROTECTION RELEASE METHOD

[75] Inventor: Rainer Krebs, Erlangen, Germany

[73] Assignee: Siemens Aktiengesellschaft, Munich, Germany

[21] Appl. No.: 403,722

[22] PCT Filed: Sep. 3, 1993

[86] PCT No.: PCT/DE93/00799

§ 371 Date: Mar. 14, 1995

§ 102(e) Date: Mar. 14, 1995

[87] PCT Pub. No.: WO94/07290

PCT Pub. Date: Mar. 31, 1994

[30] Foreign Application Priority Data

Sep. 14, 1992 [DE] Germany ............ 42 30 692.2

[51] Int. Cl.$^6$ .................................................. H02H 3/18
[52] U.S. Cl. ............. 361/80; 361/93; 361/115; 361/66
[58] Field of Search ............... 318/560, 803; 361/115, 80, 93, 66, 64, 62, 24; 364/483, 492, 424.05, 493; 395/3, 61

[56] References Cited

U.S. PATENT DOCUMENTS

| | | | |
|---|---|---|---|
| 5,272,428 | 12/1993 | Spiegel | 318/803 |
| 5,289,095 | 2/1994 | Ushiyama | 318/560 |
| 5,327,355 | 7/1994 | Chiba | 364/483 |
| 5,371,695 | 12/1994 | Baraszu | 364/724.19 |
| 5,416,702 | 5/1995 | Kitagawa | 364/424.05 |

*Primary Examiner*—Jeffrey A. Gaffin
*Assistant Examiner*—Stephen Jackson
*Attorney, Agent, or Firm*—Kenyon & Kenyon

[57] ABSTRACT

In order to achieve improved release characteristics in the case of a protective device for power supply lines, a protection release method is proposed in which at least one signal (i, u) is supplied to a filter device (3, 16), and a release decision is made as a function of its output signal (SA, Z). If the conditions are insufficient for release, a change is made to the filter characteristics. The filter device (3, 16) in this case preferably comprises adaptive filters or combinations of filters. In a further refinement, a fuzzy region, which is used as the release criterion, is formed as a function of a change in the output signal.

21 Claims, 3 Drawing Sheets

PROTECTION RELEASE METHOD

BACKGROUND OF THE INVENTION

So-called protective devices which monitor lines for faults are used to protect the operation of power supply lines. One such protective device is, for example, a distance protection device. Distance protection measures the impedance of the line and monitors this line for undershooting an impedance value which can be predetermined. Undershooting occurs, for example, in the case of short circuits.

A problem with modern distance protective devices of digital design is that filters are used which have a fixed window width and a fixed release criterion. In this case, there is a contradiction between the two criteria "high accuracy of impedance determination" and "short command time for the off command". Specifically, if a protection algorithm is to operate quickly at a fixed technically sensible sampling frequency, then digital filters having few coefficients must be used. When disturbance variables occur, such filters have large errors in the impedance determination, which leads to a disturbance in the selectivity. In contrast, if a protection algorithm is to operate as selectively as possible, then filters having large numbers of coefficients must be used to damp interference variables. The protection algorithm then, however, has relatively long command times. This problem is known, for example, from "Proceedings of the 25th Universities Power Engineering Conference", Aberdeen, UK, Sep. 12–14, 1990, pages 155 to 158.

A test method is known from EP 0 284 546, in which filters having a fixed window width are used.

SUMMARY OF THE INVENTION

The present invention is based on the object of specifying a signal monitoring method in which the above-mentioned disadvantages of the contradicting criteria are addressed.

Proceeding from the prior art, the inventor found a new way by dispensing with measured-value filters having fixed filter characteristics. Specifically, he confirmed that very inaccurate filters are completely sufficient for certain faults, while high-precision filters are required only in some fault cases.

The object was achieved by a method including the steps of supplying at least one signal to a filter device which has a time-variant filter behavior deriving a fuzzy region from an output signal of said filter device, prompting a release when the fuzzy region is within a release range having limits which can be predetermined, and improving filter characteristics if the conditions are not sufficient for release.

A monitoring device includes a filter device for a signal, said device having a time-variant filter behavior, and downstream-connected release logic in which a fuzzy region is derived from an output signal of the filter device wherein a release signal is produced when the fuzzy region is within a release range having limits which can be predetermined, and wherein a comparison is carried out with improved filter characteristics if the conditions are not sufficient for release. In this way, a signal monitoring method is available which is matched to the present fault situation of the signal. In consequence, simple faults which require only a coarse filter function can be identified in a very short time and lead to a release, while faults which require a higher precision filter function are subject to more intensive filter processing. The method achieves release times which are improved over the prior art in the vast majority of cases.

A fuzzy region, which is used for the release decision, is preferably derived from the output signal, the change with time of the output signal being used in particular. In consequence, a further reduction in the release times can be achieved. In this case, the fuzzy region is to be understood to mean the probability of how precisely the determined impedance (measured-value impedance) corresponds with the actual line impedance (measured impedance). The fuzzy region can be dependent on the filter characteristic and/or the magnitude of a disturbance variable and is in this case used in the sense of a known measurement inaccuracy. If, for example, the output signal has a relatively large fuzzy region, the entire fuzzy region having to satisfy a release criterion, then a positive release decision can be made particularly quickly. In the case of a negative release decision, the filter is improved until the fuzzy region is constrained and a clear release decision can be made.

Fuzzy logic can be used in an advantageous manner for this function, it being possible to use weighing of disturbance variables in order to form the fuzzy region. The improvement in the filter characteristic can in this case be carried out continuously and automatically.

It is advantageous if a release range having limits which can be predetermined is predetermined for the release decision. In consequence, the method can be matched to specific fault cases. In particular, the method can be used for monitoring current, voltage, and, in particular, an impedance. The signals can in this case be formed as alternating signals. A preferred application is in the case of distance protection, an impedance signal then being monitored. The method has achieved very good results in trials in this application, where it was not only possible to improve the release or command times of the distance protection, but also its precision.

Alternatively, fuzziness of the limits which can be predetermined can also be formed. This option can possibly lead to simplification of the method when designed as a program in a computer. The controllable filter can also comprise a plurality of filter types, so that the most optimum filter for the fault case is selected depending on the disturbance variables identified. The filter can in this case also be designed to be auto-adaptive or auto-improving in the sense of a cyclic improvement. In this way, no feedback from release logic is necessary. The filter is preferably designed to include an adaptive filter, especially an FIR filter, with a number of support points which can be predetermined, and wherein filter characteristics are improved by increasing the number of support points.

The design of the monitoring device is particularly simple if a digital computer is used. The preferred application is given as a distance protective device for power supply lines. Further advantages of the invention result from that which has been mentioned above, the other claims, and from the description.

BRIEF DESCRIPTION OF THE DRAWINGS

The invention is explained in more detail in the following text, with reference to design variants by way of example.

DETAILED DESCRIPTION

Figure 1:
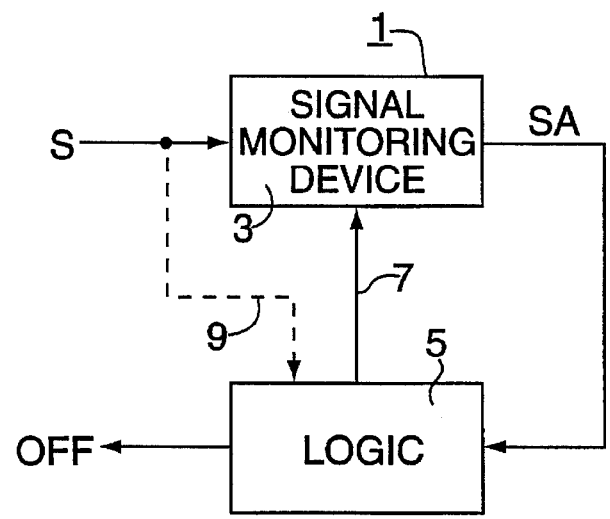
FIG. 1 shows a block diagram of the monitoring device.

The block diagram according to FIG. 1 shows an arrangement, especially a signal monitoring device 1, in the case of which a signal S which changes with time is supplied to a filter device, especially a filter 3. The output signal SA is supplied to release logic 5, which makes a release decision as a function of the output signal SA and, in the event of a fault, produces and emits an off signal. The off signal can then be subjected to further processing or be used as an input signal for a switching element, for example a power breaker.

The filter 3 is in this case designed as a variable filter, for example as an adaptive filter or as a combination of a plurality of filter types, which can be connected in parallel or in series. In this case, the filter 3 has an optimizing function, that is to say that the filter function is improved as a function of time. This can be done, for example, by refining the filter 3 as an adaptive filter or by changing over between various filter types. This provides the option of an output signal SA which changes and qualitatively improves itself. Adaptive filters are also known by the term FIR filters.

A release decision is made in the release logic 5 as a function of the output signal SA. A fuzzy region is initially formed for this purpose. The fuzzy region includes a statement on the probability of how precisely the present output signal SA corresponds with the actual value to be determined. In this case, a fuzzy region can be formed with respect to the output signal SA or with respect to a predetermined limit of the release range of the release logic 5. As a result of this, if a fault occurs in the signal S, a relatively large fuzzy region initially exists as a result of the filter 3 having a filter characteristic which is admittedly not so good, but is fast. If the release criterion is satisfied despite the large amount of fuzziness, then an immediate release occurs. The probability that a fault is within the predetermined limits is satisfied.

If, however, an intersection occurs between the fuzzy region and the release criteria, waiting takes place until an improvement of the filter 3 allows an unambiguous decision. For this purpose, a control signal can also be passed from the release logic 5, via a signal path 7, to the filter 3 in order to improve the filter function. In this way, a control loop is formed. The dashed line 9 indicates that the signal S can also be passed directly to the release logic 5 for identification of disturbance variable patterns (possibly with the interposition of further processing).

Figure 2:
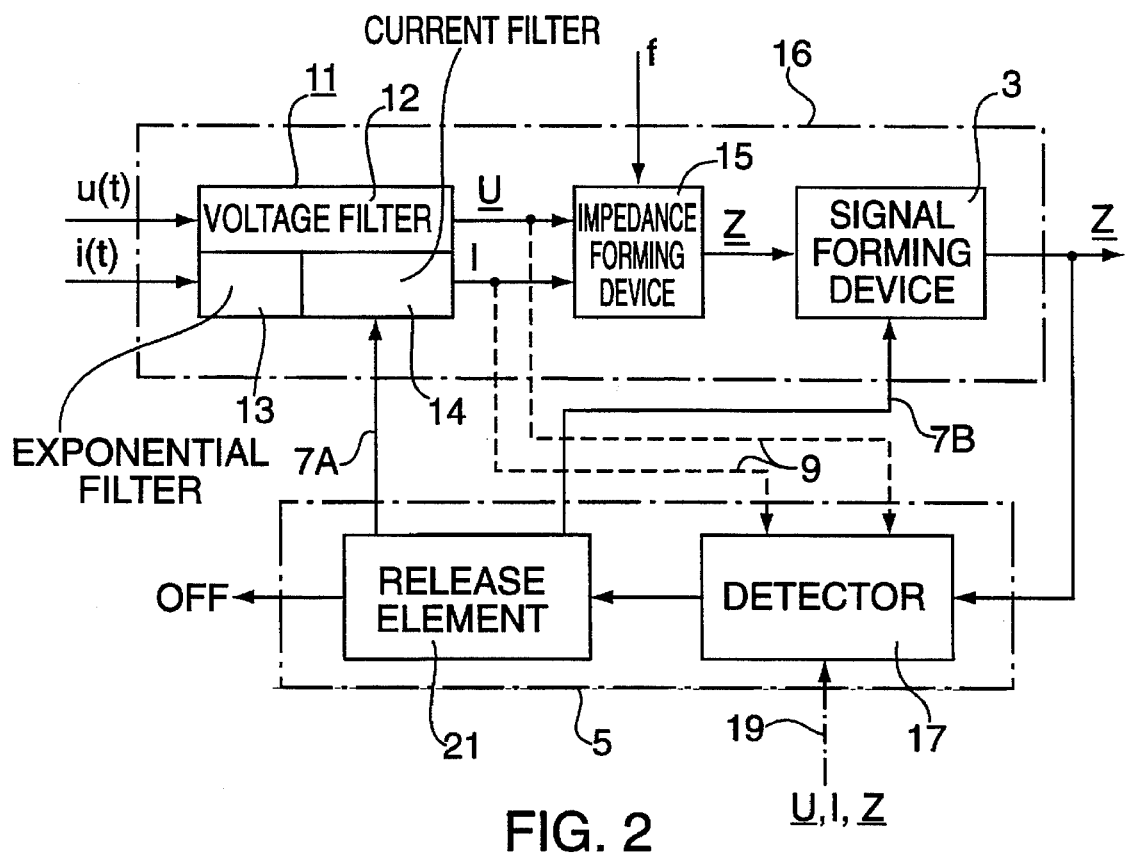
FIG. 2 shows a detailed block diagram.

FIG. 2 shows a more detailed illustration of the method as a block diagram, as it can preferably be used in the case of distance protective devices. For this purpose, a voltage signal u and a current signal i are initially supplied to a measured-value filter 11. The measured-value filter 11 comprises a voltage filter 12, a first filter for the current, for example an exponential filter 13, and a further current filter 14. The current filter 14 and the voltage filter 12 are designed as variable filters, especially as adaptive filters. The received signals U, I are then supplied together with a frequency signal f to an impedance forming device 15. Its output signal is then supplied via the filter 3 to the release logic 5. The arrangement of the modules 11, 15 and 3 in this case forms a filter device 16.

Fuzziness is formed in a detector 17. Direct detection of disturbance variables can possibly also be carried out via additional signal lines, as indicated by the line 9, from the signals U, I. Furthermore, information from other protective devices can be supplied to the detector 17 via a line 19 (comparative protection).

The release decision is made, and an off signal formed, in a release element 21. In the event of impedance fuzziness, conformity with a predetermined limit polygon is monitored here. In the event of the release conditions being insufficient, the variable filters 12, 14 and 3 then receive a control signal via the signal paths 7a, 7b, which leads to an improvement in the measurement precision for the impedance Z and to a reduction in the fuzziness. Fuzzy logic is preferably used in the release logic 5 to form the fuzzy region and for release. The assessment or weighing of the measured signal leads to a release decision which is on the one hand faster and is on the other hand more precise. The consequence of this is maximum selectivity of the protective device. More precise statements relating to specifically possible refinements of the individual modules of the protective device are made in the following text.

With respect to the measured-value filter 11

The complex vectors are initially formed from the time profiles of the current i and the voltage u, using modified linear-phased Fourier adaptive filters. This is done starting with a minimum number of support points 3 in the current filter 14 and 7 in the voltage filter 12. The number of support points is increased automatically. The linear-phase nature of the filters used has the advantage that any convolution makes do with half the computation operations because of the symmetry in the filter coefficients resulting therefrom. The offset in the support points in the current path and voltage path can be used for the purpose of suppressing the aperiodic element in the short-circuit current with the exponential filter 13. This element could otherwise be identified as a disturbance variable in the detector 17, which would lead to a delay in the off command.

When new sample values arrive after a fault has occurred or after general excitation, the level of the modified Fourier filters is increased via the signal path 7a until all the disturbance variables are sufficiently damped and a reliable decision can be made in the release element 21, which decision has the greatest probability of being the correct decision. A minor modification to known Fourier filters allows a damping change which is as large as possible to be achieved for the disturbance variables during the design of the filters for the fuzzy control which is dependent on the disturbance variables.

With respect to the impedance forming device 15

The impedance forming device 15 is used to carry out the determination of the resistance and of the reactance of the line as far as the fault point. The reactance can be corrected from the mains frequency to a nominal frequency.

With respect to the filter 3

Investigations have shown that low-pass filtering of the impedances by means of square-wave or Hamming adaptive filters leads to the best results, which is justified by the fact that a stationary short circuit must lead to a constant line reactance. The influence of moving short circuits is in consequence only somewhat smoothed.

With respect to the detector 17

The fuzziness is derived from the changes in the line reactance (and the resistance) during the filter adaptation in the measured-value filter 11 and the filter 3 (fuzzy element). Measurement data from the opposite relay, for example for improved fault localization, can also be taken into account at this point in the control loop. This method step can possibly also be carried out in the release element 21. In addition, disturbance variables can frequently be detected even in the input signals u and i or in the filtered signals U and I, using pattern recognition methods, which leads to premature adaptation of the filter functions to the disturbance variables.

With respect to the release element 21

The probability of the statement "final value of measured-value impedance is within the release polygon of the zone x"

is essentially determined here. If the probability is less than "1" (see also FIGS. 3, 4 and 5), then the filters are adapted further in order to suppress the disturbance variables better. The off command is not formed until the probability is equal to "1". In the case of signals where the disturbance variables are low, the probability becomes "1" even when the filters have a relatively low window width. The off command can thus be formed very quickly and reliably. In the case of signals where the disturbance variables are high and in the case of short circuits close to the release polygon, the probability of 1 is not achieved until the window width is relatively large.

Figure 3:
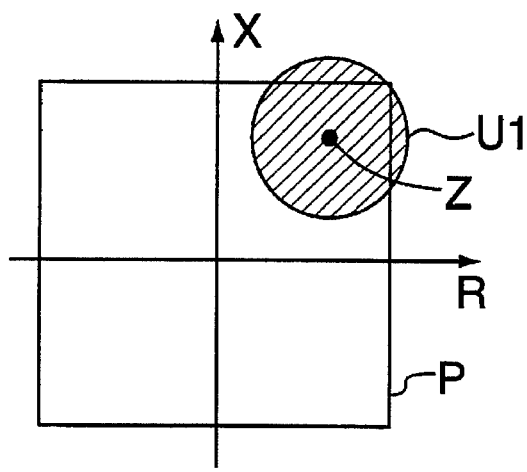
FIGS. 3, 4 and 5 show examples of release polygons.

FIG. 3 shows a release polygon P which is formed from predetermined limits and on which an impedance Z is illustrated having a fuzzy region U1. The fuzzy region U1 is not yet entirely located in the release polygon P. Release will thus not yet take place since the possibility exists that the actual impedance as far as the short-circuit point is outside the release polygon P.

Figure 4:
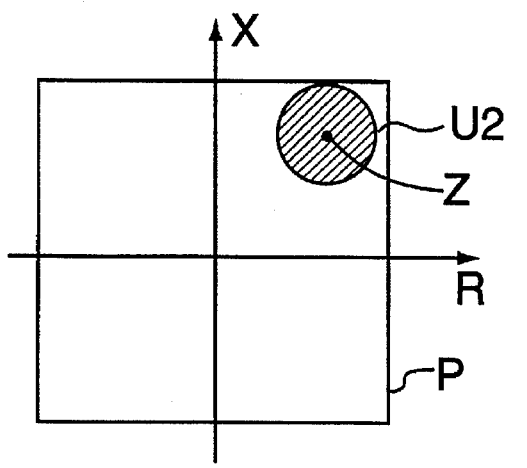

FIG. 4 shows a condition which can occur after an improvement in the filters—following the situation according to FIG. 3 or else at the start of a measurement process. Despite a fuzzy region U2, a precise decision on the fault case can be made since the entire fuzzy region U2 is located within the release polygon P.

Figure 5:
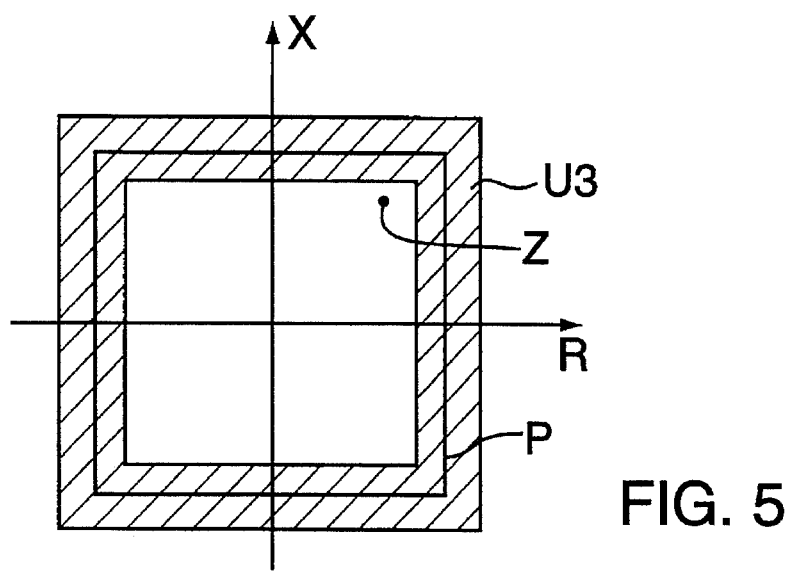

FIG. 5 shows an equivalent situation to this in which the fuzzy region U3 is displaced into the release polygon P. The procedure is to be used in the same sense as that described above.

Figure 6:
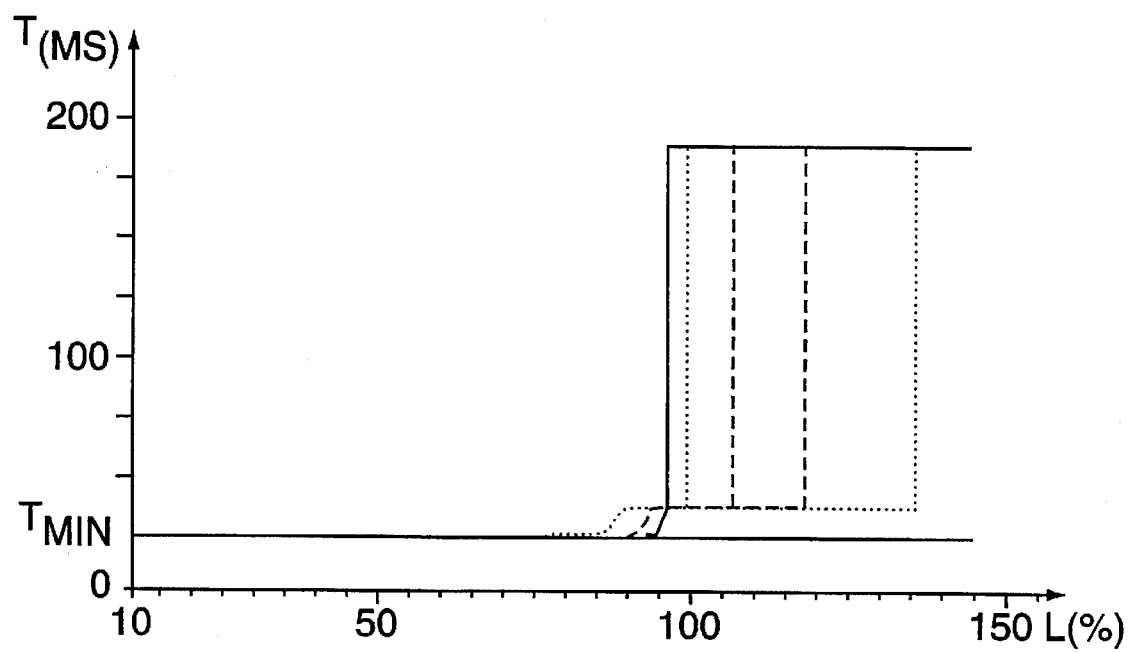
FIG. 6 shows a release diagram according to the prior art.

FIG. 6 shows a command time response of a distance protective device according to the prior art in the event of a disturbance in the measurement voltage as a result of different disturbance levels (harmonics). The various fault cases are shown. It can be seen that the device requires a minimum release time tmin. In the rear region (greater than 100%) of the curves shown, an inaccuracy in the distance determination also occurs, as well as non-selective release.

Figure 7:
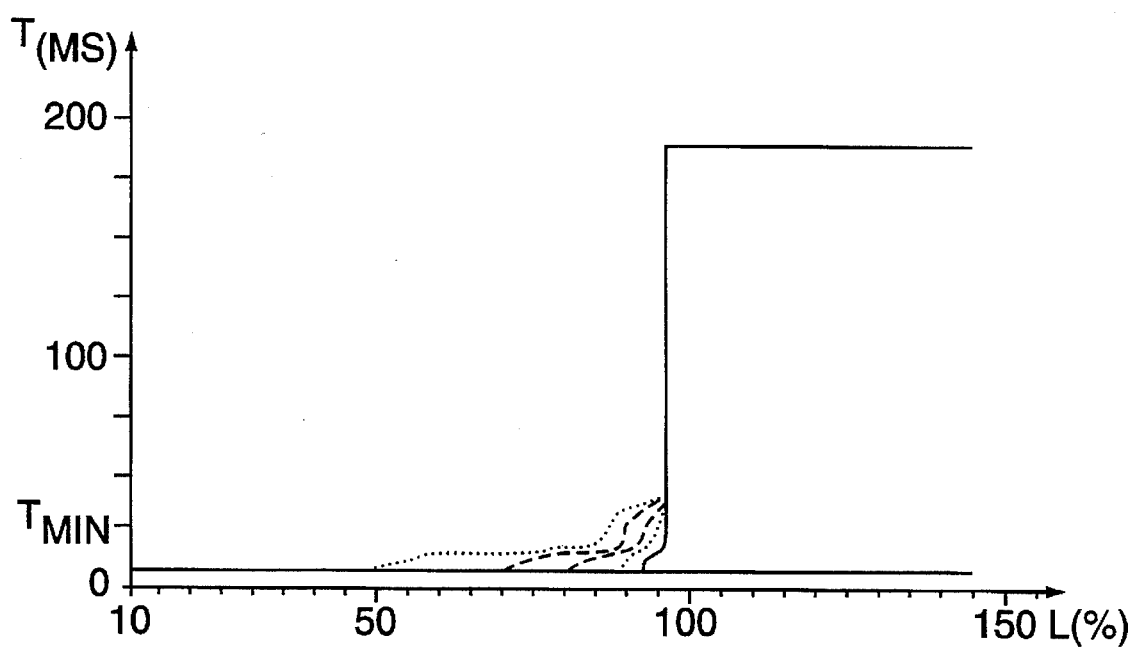
FIG. 7 shows a release diagram according to the present invention.

In the illustration according to FIG. 7, the release is shown according to the proposed method. The minimum release time tmin is considerably reduced. In the rear region of the curve, a considerable improvement in the distance determination can be found. Non-selective release is virtually precluded. Small differences for different faults can still be identified only in the central region. However, the results achieved are better than with the prior art in every case.

The proposed method and the associated device can, of course, also be refined within the context of the knowledge of a person skilled in the art. For example, general use for measured-valued processing or else for overcurrent time protection is conceivable. However, the preferred application is in the case of digital distance protection, in which microcomputers and digital filters which are designed as a program are used. The renunciation of fixedly predetermined limits for a probability consideration in order to form a release command leads to considerably improved protection characteristics.

What is claimed is:

1. A protection release method, comprising the steps:
   supplying at least one signal to a filter device which has a time-variant filter behavior;
   supplying an output signal of the filter device to a fuzzy logic device;
   deriving in the fuzzy logic device a fuzzy region from the output signal of said filter device;
   prompting a release when the fuzzy region is within a release range having limits which can be predetermined, and adjusting filter characteristics if the conditions are not sufficient for release.

2. The protection release method of claim 1, further comprising the step of employing a fuzzy logic to form said fuzzy region.

3. The protection release method as claimed in claim 1, wherein the fuzzy region is formed as either a function of the filter characteristic or the magnitude of an interference variable.

4. The protection release method of claim 3, further comprising the step of employing a fuzzy logic to form said fuzzy region.

5. The protection release method of claim 1, wherein said filter device has an adaptive filter, especially an FIR filter, with a number of support points which can be predetermined, and wherein filter characteristics are improved by increasing the number of support points.

6. The protection release method of claim 5, further comprising the step of employing a fuzzy logic to form said fuzzy region.

7. The protection release method of claim 1, wherein a change with time of the output signal is used to form said fuzzy region.

8. The protection release method as claimed in claim 7, wherein the fuzzy region is formed as either a function of the filter characteristic or the magnitude of an interference variable.

9. The protection release method of claim 7, wherein said the filter device has an adaptive filter, especially an FIR filter, with a number of support points which can be predetermined, and wherein filter characteristics are improved by increasing the number of support points.

10. The protection release method of claim 7, further comprising the step of employing a fuzzy logic to form said fuzzy region.

11. A signal monitoring device comprising:
    a filter device for a signal, said device having a time-variant filter behavior, and
    downstream-connected release fuzzy logic in which a fuzzy region is derived from an output signal of the filter device;
    wherein a release signal is produced when the fuzzy region is within a release range having limits which can be predetermined; and
    wherein a comparison is carried out with modified filter characteristics if the conditions are not sufficient for release.

12. The signal monitoring device of claim 11, wherein the fuzzy region is derived in the release logic from the change with time of the output signal.

13. The signal monitoring device of claim 12, wherein said filter device has at least one adaptive filter, especially an FIR filter, with a number of support points which can be predetermined, and the filter characteristics are improved by increasing the number of support points.

14. The signal monitoring device of claim 12, wherein a changeover is made from a first filter type to a second filter type to improve the filter characteristic.

15. The signal monitoring device of claim 12, further comprising a fuzzy element for forming the fuzzy region.

16. The signal monitoring device of claim 12, wherein the release logic has an interface for data interchange with further devices.

17. The signal monitoring device of claim 11, wherein said filter device has at least one adaptive filter, especially an FIR filter, with a number of support points which can be predetermined, and the filter characteristics are improved by increasing the number of support points.

18. The signal monitoring device of claim 17, wherein a changeover is made from a first filter type to a second filter type to improve the filter characteristic.

19. The signal monitoring device of claim 17, further comprising a fuzzy element for forming the fuzzy region.

20. The signal monitoring device of claim 17, wherein the release logic has an interface for data interchange with further devices.

21. The signal monitoring device of claim 17, wherein the release logic has an interface for data interchange with further devices.

* * * * *